US008635392B1

(12) United States Patent
Wang

(10) Patent No.: US 8,635,392 B1
(45) Date of Patent: Jan. 21, 2014

(54) MEDIA ACCESS CONTROL SECURITY (MACSEC) MANAGEMENT WITH A LAYER MANAGEMENT INTERFACE (LMI) CONFIGURED TO COMMUNICATION OVER MANAGEMENT DATA INPUT/OUTPUT (MDIO) PROTOCOL

(71) Applicant: Broadcom Corporation, Irvine, CA (US)

(72) Inventor: David (Wei) Wang, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/651,107

(22) Filed: Oct. 12, 2012

(51) Int. Cl.
*G06F 7/04* (2006.01)
(52) U.S. Cl.
USPC ............. 710/105; 713/151; 713/181; 726/26; 726/27; 370/252; 370/519; 710/20; 710/100
(58) Field of Classification Search
None
See application file for complete search history.

(56) References Cited

U.S. PATENT DOCUMENTS

| 7,729,276 | B2* | 6/2010 | Akyol ......................... 370/252 |
| 8,250,370 | B1* | 8/2012 | Hutchison et al. ............ 713/181 |
| 8,295,312 | B2* | 10/2012 | Diab et al. .................... 370/519 |
| 2007/0064724 | A1* | 3/2007 | Minami et al. ................ 370/463 |
| 2011/0035580 | A1 | 2/2011 | Wang et al. |

* cited by examiner

*Primary Examiner* — Tammara Peyton
(74) *Attorney, Agent, or Firm* — Sterne, Kessler, Goldstein & Fox P.L.L.C.

(57) ABSTRACT

A layer management interface (LMI) to communicate with a processor over MDIO protocol, and to communicate with a media access control security (MACsec) functional block over a local network protocol, the LMI including a command register to receive command information for transacting data information with the destination portion within the MACsec, an address register to receive address information associated with the destination portion without conducting all the MDIO address cycles required by the MDIO protocol to receive the address information, the LMI being configured to determine a location of the destination portion based on the received address information, and a data register to transact the data information without conducting all MDIO data cycles required by the MDIO protocol to transact the data information, and to transact the data information with the determined destination portion based on the command information over the local network protocol.

20 Claims, 12 Drawing Sheets

MEDIA ACCESS CONTROL SECURITY (MACSEC) MANAGEMENT WITH A LAYER MANAGEMENT INTERFACE (LMI) CONFIGURED TO COMMUNICATION OVER MANAGEMENT DATA INPUT/OUTPUT (MDIO) PROTOCOL

FIELD

This application relates generally to communication between a processor of an external host and a media access control security (MACsec) function block of a device via the management data input/output (MDIO) protocol, the MACsec function block being implemented within the physical layer (PHY) of the device.

BACKGROUND

The Institute of Electrical and Electronics Engineers (IEEE) 802.1AE standard is the media access control (MAC) security standard, commonly referred to as MACsec. MACsec defines connectionless data confidentiality and integrity for media access independent protocols. MACsec defines protocols to implement security requirements for protecting data traversing networks, such as Ethernets and local area networks (LANs). The MACsec infrastructure may allow for data confidentiality, data integrity, and data origin authentication. For example, MACsec may allow for unauthorized LAN connections to be identified and excluded from communication within the network.

The device that includes the MACsec function block may be a device from the Open Systems Interconnection Reference Model (OSI model). The lowest three layers of the devices from the OSI model include the physical layer, the data link layer, and the network layer. The physical layer defines electrical and physical specifications for devices, including a relationship between a device and a physical medium. The data link layer provides for the transfer of data between network entities and error correction. The network layer provides for the transfer of variable length data from a source to a destination via one or more networks. The MACsec, when implemented into conventional networks performing under Clause 22 of the IEEE 802.3AE standard, is implemented on either the data link layer and/or on the network layer of the devices from the OSI model. Such devices include switches and/or network controllers. Implementing the MACsec into the physical layer (PHY requires replacing the existing hardware of the network and also sacrifices performance in terms of throughput and latency.

DETAILED DESCRIPTION OF THE INVENTION

Figure 1A:
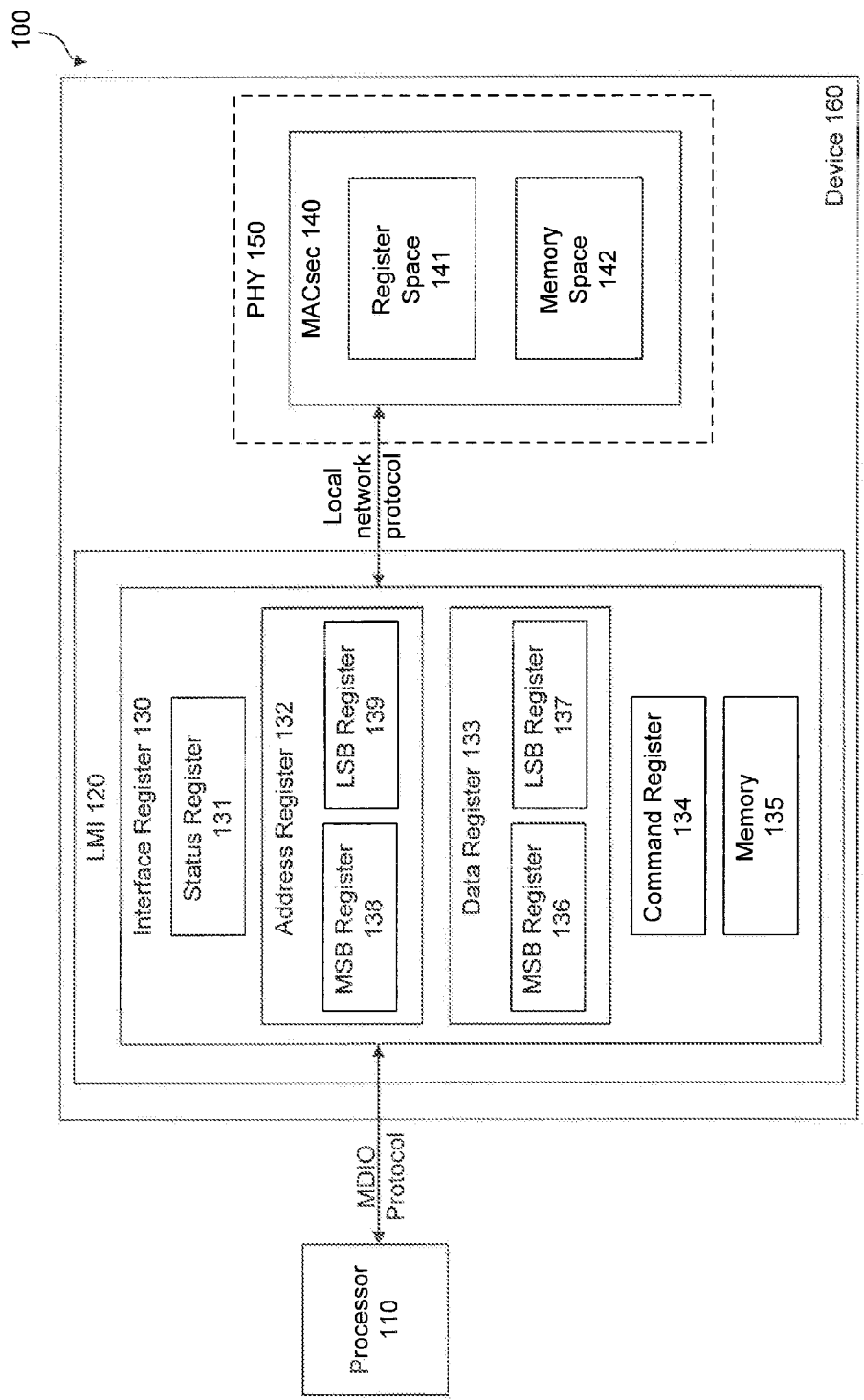
FIG. 1A illustrates an exemplary system 100 according to an embodiment of the disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details.

As discussed above, there is a need to implement the MACsec into the PHY layer of the device without replacing the existing hardware of the network and without sacrificing performance in terms of throughput and latency. Further, the currently proposed Clause 45 of the IEEE 802.3AE standard requires that the MACsec be implemented in the PHY. However, implementation of the MACsec in the PHY of the OSI model device presents the following issues.

The MDIO protocol requires that the processor utilize two separate MDIO cycles/transactions to access (e.g., read from, write to, etc.) each MACsec register or memory. The two separate cycles/transactions involve an address cycle and a data cycle. First, in the address cycle, the processor is required to provide the register address of a register in the OSI model device. Second, in the data cycle, the processor transacts (receives or provides) data to be processed. Since communication via the MDIO protocol under Clause 22 of the IEEE 802.3AE standard did not require the above-mentioned address cycle, operation under Clause 45 of the IEEE 802.3AE standard demands higher MDIO bandwidth. Further, the MDIO protocol is limited in that the processor may transact only 16 bits of information or data at a time via the MDIO bus. Therefore, for example, when the processor wishes to write 32 bits of data to the MACsec memory, the processor is required to utilize eight separate MDIO cycles/transactions—four address cycles, each address cycle transacting 16 bits of address information, and four data cycles, each data cycle transacting 16 bits of data. These limitations of the MDIO protocol lead to latency and bottlenecking in the network system that result in impediments to implementing MACsec in the physical layer of the device.

Another issue with implementing the MACsec into the PHY relates to the initialization and the programming of the MACsec. Specifically, under Clause 45 of the IEEE 802.3AE standard, the initialization and programming of the MACsec core implemented in the PHY is very time-consuming. This is because of the large capacity of the MACsec register and memory, and the above-mentioned additional requirement of the address cycle under Clause 45 operation. In this case, the initialization and programming of the MACsec may undesirably last up to several seconds.

Other issues faced when the MACsec is implemented in the PHY include the overflow of management information base (MIB) counters requiring recursive collection within a certain time interval which cannot be met due to the above limitations of the MDIO protocol, and expiration of Security Association (SA) keys which also need to be refreshed within a certain time interval not supported by the MDIO protocol.

FIG. 1A illustrates an exemplary system 100 according to an embodiment of the disclosure. As discussed below, system 100 overcomes the above limitations while working within the confines of the MDIO protocol and also implements the MACsec in the PHY without replacing the existing hardware of the network. The system 100 includes a processor 110 and an OSI model device 160 connected via a network. The device 160 includes a PHY 150 having a MACsec function block 140 implemented therein. The MACsec 140 includes register space 141 and memory space 142. The device 160 also includes a Layer Management Interface (LMI) block 120 having an interface register 130 which includes a status register 131, an address register 132, a data register 133, a command register 134, and a memory 135. The address register 132 includes a least significant bit (LSB) address register 139 and a most significant bit (MSB) address register 138. The data register 133 includes a least significant bit (LSB) data register 137 and a most significant bit (MSB) data register 136.

The LMI block 120 communicates with the processor 110 via the MDIO protocol (over any number of MDIO buses configured to operate in parallel) and communicates with the MACsec 140 via a local and/or a proprietary network protocol (e.g., S-Bus protocol). As such, the LMI block 120 provides the processor 110 with indirect access to the MACsec 140. In one embodiment, the processor 110 may issue commands (to be executed by the MACsec 140) over the MDIO protocol to the LMI block 120, and the LMI block 120 may translate the MDIO commands to the local/proprietary network protocol and may provide the same to the MACsec 140 for execution. The LMI block 120 may receive the results of the execution of the MDIO commands from the MACsec function block 140 over the local/proprietary network protocol, and translate the results to the MDIO protocol and provide the same to the processor 110 over the MDIO protocol buses. As such, the processor 110 may function as the MDIO master and the LMI block 120 may function as the MDIO slave. In this embodiment, the interface register 130 may receive the MDIO commands from the processor 110. The command register 134 may process the MDIO commands and determine whether the MDIO commands include, for example, a read command or a write command. The address register 132 may include a list of MACsec addresses corresponding to the register space 141 and/or the memory space 142 in the MACsec function block 140. The data register 133 may store the data that is received from the processor 110 and is to be written to the MACsec 140 and/or the data that is read from the MACsec function block 140 and is to be provided to the processor 110. Further, the memory 135 may assist the data register 133 in storing any excess data that is received from the processor 110 and is to be written to the MACsec 140 and/or any excess data that is read from the MACsec 140 and is to be provided to the processor 110. In one embodiment, the memory 135 may function as a first-in first-out (FIFO) memory and/or act as a buffer with respect to the data received from the processor 110 by the data register 133 or the data being provided to the processor 110 by the data register 133.

In providing the above indirect access between the processor 110 and the MACsec 140, the LMI block 120 provides a way of direct mapping for the MDIO commands received from the processor 110 to the register space 141 and/or memory space 142. It is also to be noted that Clause 45 MDIO protocol allows a mapping of up to 16 bits of register space. However, the MACsec 140 requires a mapping of at least 32 bits of register space, rather than the 16 bits mapped by the Clause 45 MDIO protocol, to access the much larger storage area provided by the register space 141 or the memory space 142. To address this discrepancy, the LMI block 120 may use the address register 132.

The address register 132 may also include two register spaces, a least significant bit (LSB) address register 139 and a most significant bit (MSB) address register 138, each of which has its own respective register address. Further, each of the LSB address register 139 and the MSB address register 138 may be capable of storing 16 bits of address information received from the processor 110. The address information may relate to a desired portion in the register space 141 and/or the memory space 142 that the processor 110 wishes to access. The respective register addresses of the LSB address register 139 and the MSB address register 138 may be associated with the address information stored within the address registers 138, 139 respectively. In this way, based on the above association of the address information with the respective register addresses and/or the list of MACsec addresses, the LMI block 120 may be able to access the desired portion (e.g., writing to and/or reading from any 32-bit portion) in the register space 141 and/or the memory space 142. In another embodiment, the LMI block 120 may read the address information stored in the address register 138, 139 and directly access the desired portion in the register space 141 and/or the memory space 142 based on the reading.

Figure 1B:
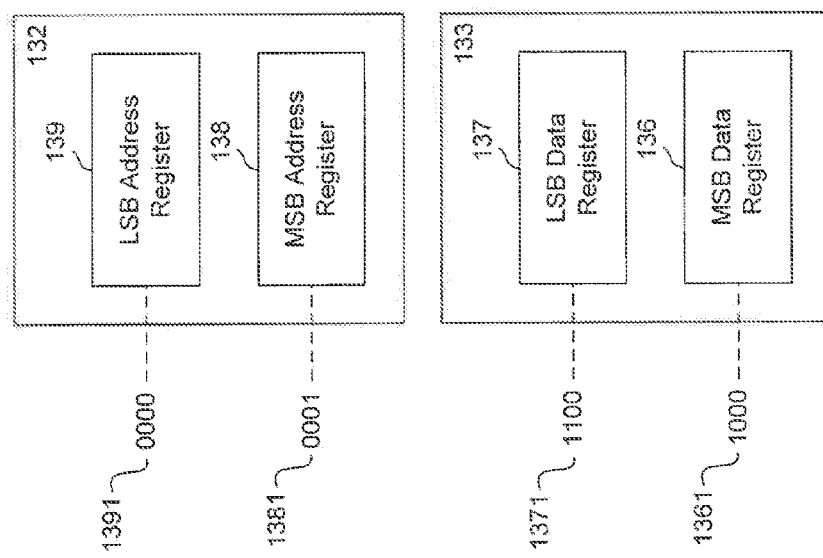
FIG. 1B illustrates an exemplary address register 132 and an exemplary data register 133 according to an embodiment of the present disclosure.

FIG. 1B illustrates an exemplary address register 132 according to an embodiment of the present disclosure. The address register 132 includes an LSB address register 139 having an LSB register address 1391 and includes an MSB address register 138 having an MSB register address 1381. The processor 110 accesses and activates (by accessing) the LSB address register 139 by using the LSB register address 1391 and accesses and activates (by accessing) the MSB address register 138 by using the MSB register address 1381. (Herein, each LSB and MSB address register 139,138 has an associated address for access as described, and is referred to herein as "register address" of the address register.)

For example, the processor 110 accesses the LSB address register 139 by including the LSB register address 1391 in a message sent to the LMI block 120 during an address cycle. In one embodiment, in the LSB register address 1391 is designed to be "0000" and the MSB register address 1381 is designed to be "0001." Therefore, in this embodiment, the fourth bit of the LSB address register 139 is designed or designated to be different from the fourth bit of the MSB address register 138 (and vice versa).

Now, for example, when the processor 110 has accessed and activated the LSB address register 139, and when the LMI block 120 recognizes that the MSB address register 138 is the next register to be accessed and activated by the processor 110, the LMI block 120 is capable of automatically activating the MSB address register 138. The LMI block 120 may automatically activate the MSB address register 138 by toggling the differently designed fourth bit of the LSB address register 139 which was last accessed (and is currently activated) by the processor 110. For example, the LMI block 120 toggles the fourth bit of the LSB register address 1391 (of the currently active LSB address register 139) from "0000" to "0001," which is the register address of the MSB address register 138. In this way, the LMI block 120 activates the MSB address register 138. Once the MSB address register 138 has been activated, and when the LMI block 120 recognizes that the LSB address register 139 is the next register to be accessed and activated by the processor 110, the LMI block 120 may then again toggle the fourth bit of the MSB register address 1381 (of the currently active MSB address register 138) from "0001" to "0000," which is the register address of the LSB address register 139. In this way, the LMI block 120 again activates the LSB address register 139.

FIG. 1B also illustrates an exemplary data register 133 according to an embodiment of the present disclosure. The data register 133 includes an LSB data register 137 having an LSB data register address 1371 and includes an MSB data register 136 having an MSB data register address 1361. (Herein, each LSB and MSB data register 137,136 has an associated address for access, and is referred to herein as "register address" of the data register.) The processor 110 accesses and activates (by accessing) the LSB data register 137 by using the LSB data register address 1371 and accesses and activates (by accessing) the MSB data register 136 by using the MSB data register address 1361. For example, the processor 110 accesses the LSB data register 137 by including the LSB data register address 1371 in a message sent to the LMI block 120 during an address cycle. In one embodiment, the LSB data register address 1371 is designed to be "1100" and the MSB data register address 1361 is designed to be "1000." Therefore, in this embodiment, the second bit of the LSB data register 137 is designed or designated to be different from the second bit of the MSB data register 136 (and vice versa).

Now, for example, when the processor 110 has accessed and activated the LSB data register 137, and when the LMI block 120 recognizes that the MSB data register 136 is the next register to be accessed and activated by the processor 110, the LMI block 120 is capable of automatically activating the MSB data register 136. The LMI block 120 may automatically activate the MSB data register 136 by toggling the differently designed second bit of the LSB data register 137 which was last accessed (and is currently activated) by the processor 110. For example, the LMI block 120 toggles the second bit of the LSB data register address 1371 (of the currently active LSB data register 137) from "1100" to "1000," which is the register address of the MSB data register 136. In this way, the LMI block 120 activates the MSB data register 136. Once the MSB data register 136 has been activated, and when the LMI block 120 recognizes that the LSB data register 137 is the next register to be accessed and activated by the processor 110, the LMI block 120 may then again toggle the second bit of the MSB data register address 1361 (of the currently active MSB data register 136) from "1000" to "1100," which is the register address of the LSB data register 137. In this way, the LMI block 120 again activates the LSB data register 137.

The LMI block 120 may also include a processor (not shown) or have access to a local processor (not shown) of the OSI model device 160 to assist in coordinating and executing the functions performed by the status register 131, the address register 132, the data register 133, the command register 134, and the memory 135.

In a conventional network, the processor 110 would have to access a 32-bit portion in the register space 141 and/or the memory space 142 by writing a 32-bit MACsec address, corresponding to the 32-bit portion, to the address register 132 using multiple MDIO transactions. In particular, to access a 32-bit portion in the register space 141 and/or the memory space 142, the processor 110 would have to first access the LSB address register 139 during the first address cycle. Then, during the first data cycle, 16 bits of the MACsec address would be written in the LSB address register 139. Then the processor would have to access the MSB address register 138 during the second address cycle. Another 16 bits of the MACsec address would be written in the MSB address register 138 during the second data cycle. The LMI block 120 would read the 16 bits stored in the LSB address register 139 and the 16 bits stored in the MSB address register 138 together, and determine which 32-bit portion of the register space 141 and/or the memory space 142 is to be accessed (for example, from which data is to be read and/or to which data is to be written). As discussed below in further detail, the proposed system 100 improves the network throughput and latency by eliminating the need for at least the above second address cycle.

The data register 133 may be responsible for storing the data that is received from the processor 110 and is to be written to the MACsec function block 140 and/or for storing the data that is read from the MACsec function block 140 and is to be provided to the processor 110. For example, the data register 133 may include two register spaces, a least significant bit (LSB) data register 137 and a most significant bit (MSB) data register 136, each of which stores data to be written to and/or to be read from the register space 141 and/or the memory space 142 of the MACsec function block 140. Each of the LSB data register 137 and the MSB data register 136 may be capable of storing 16 bits of data information. The processor 110 may access (write to and/or read from) the register space 141 and/or the memory space 142 of the MACsec function block 140 by providing data to or receiving data from the data register 133 using multiple MDIO transactions. For example, to write 32 bits of data to the register space 141 and/or the memory space 142, the processor 110 may first access the LSB data register 137 in the first address cycle. Then, the processor 110 may provide 16 bits of write data during a first data cycle to be stored in the LSB data register 137. During the second address cycle, the processor 110 may access the MSB data register 136. Then, during the second data cycle, the processor 110 may provide another 16 bits of the write data to be stored in the MSB data register 136. The LMI block 120 may then combine the 16 bits of the write data from the LSB data register 137 and the 16 bits of the write data from the MSB data register 136 to write to the 32-bit portion of the register space 141 and/or the memory space 142 determined (by the address register 132) based on the list of MACsec addresses.

In the present disclosure, the memory 135 may assist the data register 133 in storing the list of MACsec addresses and any excess data that is received from the processor 110 and is to be written to the MACsec function block 140 and/or any excess data that is read from the MACsec function block 140 and is to be provided to the processor 110. For example, if the processor wishes to write 64-bits (0-63) of data to the memory space 142, then bits 0-15 may be first written in the MSB data register 136 during the first data cycle, and bits 16-31 may be written in the LSB data register 137 during the second data cycle. Then, bits 32-47 may be written to the memory 135 during the third data cycle, and finally, bits 48-63 may be written to the memory 135 during the fourth data cycle. In one embodiment, the memory 135 may function as a first-in first-out (FIFO) memory. In this case, once bits 0-15 are written to the memory space 142, bits 32-47 may be written to the MSB data register 136 from the memory 135, and once bits 16-31 are written to the memory space 142, bits 48-63 may be written to the LSB data register 138 from the memory 135.

In the above example, even though it is disclosed that the LMI block 120 receives the 64 bits of data in order of 0-15 bits during the first data cycle, 16-31 bits during the second data cycle, 32-47 bits during the third data cycle, and 48-63 bits during the fourth data cycle, the disclosure is not limited by this order. For example, the LMI block 120 may receive the 16-31 bits of data during the first data cycle, the 0-15 bits of data during the second data cycle, the 48-63 bits of data during the third data cycle, and the 32-47 bits of data during the fourth data cycle. Therefore, any order of receipt of the data bits is within the scope of the disclosure given that the data is stored in the location desired (by the processor 110) in the MACsec function block 140.

Now conventionally, to write the above 64-bit data to a 64-bit portion of the memory space 142, the processor 110 would be undesirably required to use eight separate address cycles and eight separate data cycles. In particular, during the first address cycle, the processor 110 accesses the LSB address register 139 to activate the LSB address register 139. Then, during the first data cycle, the processor 110 writes the first 16 bits of address information corresponding to the 64-bit portion to the activated LSB address register 139. During the second address cycle, the processor 110 then accesses and activates the MSB address register 138. Then, during the second data cycle, the processor 110 writes the second 16 bits of address information corresponding to the 64-bit portion to the activated MSB address register 138. At this point, the LMI block 120 uses the 16 bits of address information provided during the first data cycle together with the 16 bits of address information provided during the second data cycle to determine a first 32-bit portion (in which subsequently provided data is to be written) of the 64-bit portion of the memory space 142. Then, during the third address cycle, the processor 110 again accesses and activates the LSB address register 139. During the third data cycle, the processor 110 writes the third 16 bits of address information corresponding to the 64-bit portion to the activated LSB address register 139. Finally, during the fourth address cycle, the processor 110 again accesses and activates the MSB address register 138. During the fourth data cycle, the processor 110 writes the final 16 bits of address information corresponding to the 64-bit portion to the activated MSB address register 138. At this point, again, the LMI block 120 uses the 16 bits of address information provided during the third data cycle together with the 16 bits of address information provided during the fourth data cycle to determine the second 32-bit portion (in which subsequently provided data is to be written) of the 64-bit portion of the memory space 142.

Now, during the fifth address cycle, the processor 110 accesses the LSB data register 137 to activate the LSB data register 137. During the fifth data cycle, the processor 110 writes the first 16 bits of data (to be written to the memory space 142) to the activated LSB data register 137. During the sixth address cycle, the processor 110 accesses and activate the MSB data register 136. During the sixth data cycle, the processor 110 writes the second 16 bits of data (to be written to the memory space 142) to the activated MSB data register 136. At this point, the LMI block 120 writes the first 16 bits of data provided during the fifth data cycle together with the second 16 bits of data provided during the sixth data cycle to the first 32-bit portion of the 64-bit portion in the memory space 142. During the seventh address cycle, the processor 110 again accesses and activates the LSB data register 137. During the seventh data cycle, the processor 110 writes the third 16 bits of data (to be written to the memory space 142) to the activated LSB data register 137. During the eight address cycle, the processor 110 again accesses and activates the MSB data register 136. Finally, during the eighth data cycle, the processor 110 writes the final 16 bits of data (to be written to the memory space 142) to the activated MSB data register 136. At this point, the LMI block 120 writes the third 16 bits of data provided during the seventh data cycle together with the final 16 bits of data provided during the eighth data cycle to the second 32-bit portion of the 64-bit portion in the memory space 142.

As is clear, in a conventional network, the throughput and latency is sacrificed due to the multiple MDIO protocol transactions. This is because of the additional requirement of the address cycle, and the limitation of the MDIO protocol to transact only 16 bits of data at a time, as discussed above. The presently proposed system 100 improves the network throughput and latency by eliminating the MDIO protocol requirement to conduct the multiple MDIO cycles while still writing the 64-bit data provided by the processor 110 to the desired location in the memory space 142. In other words, the presently disclosed system 100 conducts fewer MDIO cycles (with respect to the conventional systems) to transact data between the processor 110 and the MACsec function block 140.

Address Toggle Mode

In one embodiment, the system 100 utilizes an address toggle mode to eliminate the requirement for the multiple MDIO cycles. In the address toggle mode, when the processor 110 wishes to write 64-bit data to the memory space 142, the processor 110 may provide this information to the LMI block 120 via, for example, command information. To write this 64-bit data, the processor 110 is required to use only two address cycles and eight data cycles, thereby eliminating six address cycles and significantly improving the network latency and throughput. As discussed below in FIG. 2C, in the address toggle mode, this is accomplished by designing one bit (the designed address bit) of the register address of the LSB address register 139 to be different from the corresponding bit of a register address of the MSB address register 138, and by designing one bit (the designed data bit) of the register address of the LSB data register 137 to be different from the corresponding bit of a register address of the MSB data register 136.

Figure 2A:
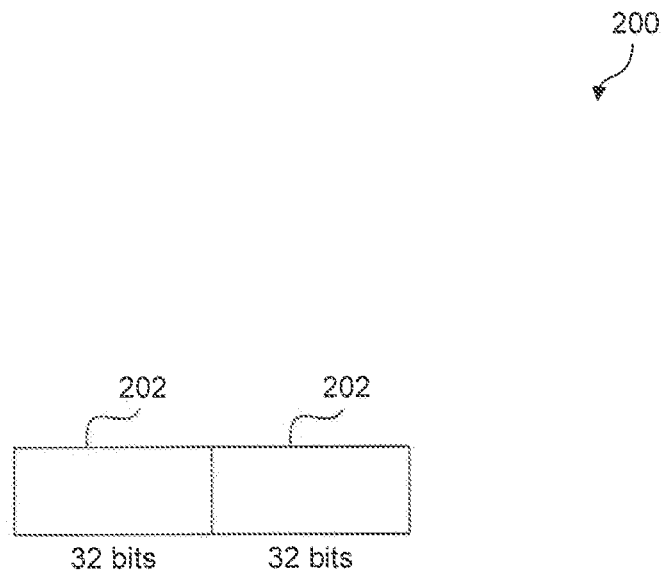
FIG. 2A illustrates an exemplary 64-bit portion 200 including two 32-bit portions 202 to which the processor 110 wishes to write data according to an embodiment of the present disclosure.
Figure 2B:
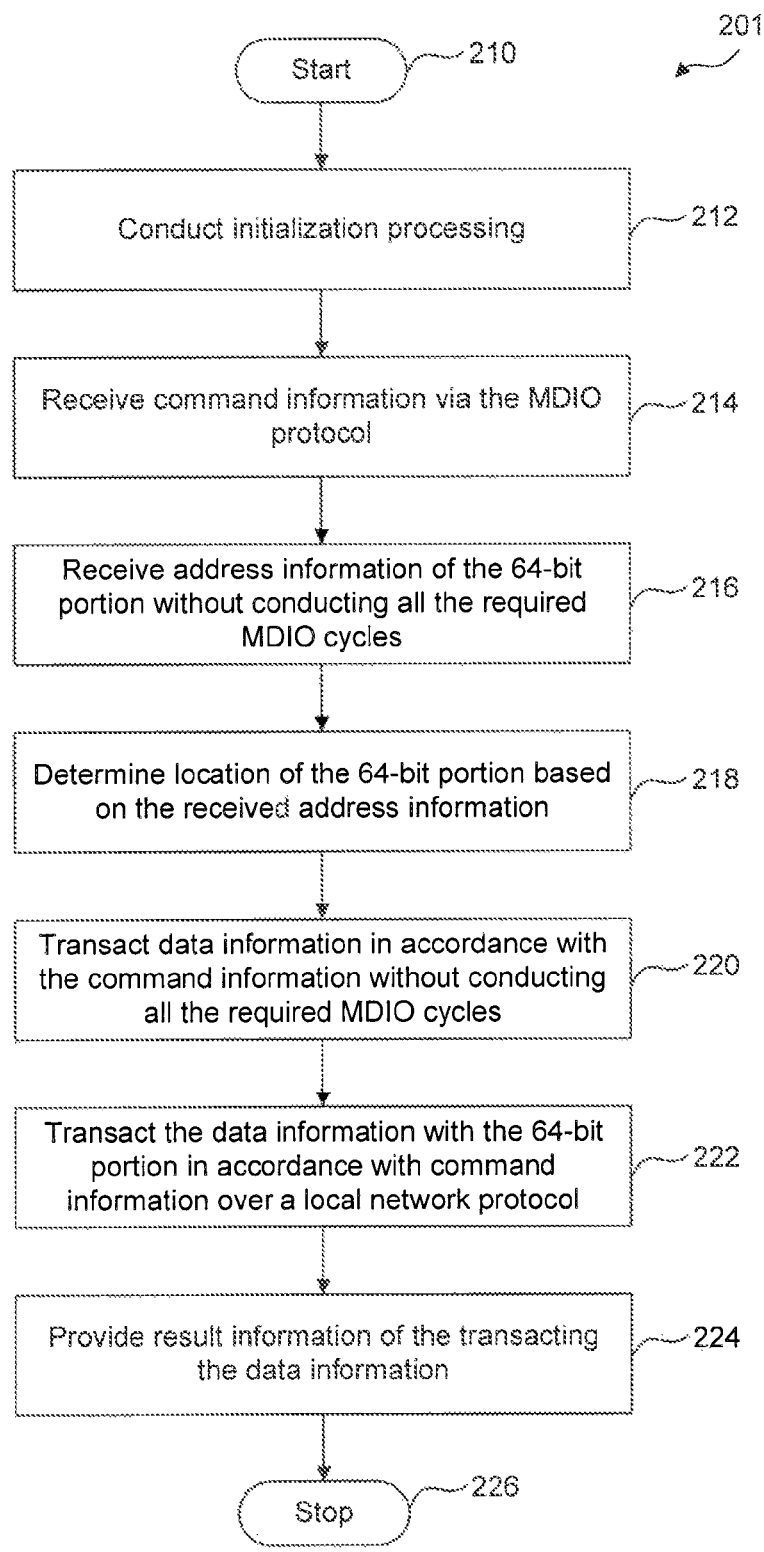
FIG. 2B illustrates an exemplary method 201 for writing data to the 64-bit portion 200 according to an embodiment of the present disclosure.

FIG. 2A illustrates an exemplary 64-bit portion 200 including two 32-bit portions 202 to which the processor 110 wishes to write data. FIG. 2B illustrates an exemplary method 201 for writing data to the 64-bit portion 200 according to an embodiment of the present disclosure. The method starts at step 210. At step 212, the LMI block 120 checks the status register 131 to determine whether the LMI block 120 has been initialized. If the status register 131 indicates that the LMI block 120 has not been initialized, the method moves back to step 210. Alternatively, if the status register 131 indicates that the LMI block 120 has been initialized, the method moves to step 214. At step 214, the LMI block 120 receives, via the MDIO protocol, command information from the processor 110 to be executed in the MACsec function block 140. Upon receipt of the command information, the command register 134 may determine whether the command information includes, for example, a write command.

At step 216, the LMI block 120 receives, via the MDIO protocol, address information of the 64-bit portion 200 without conducting all the MDIO address cycles which are required conventionally. At step 218, the LMI block 120 determines the location of the 64-bit portion 208 based on the address information received in step 216.

Figure 2C:
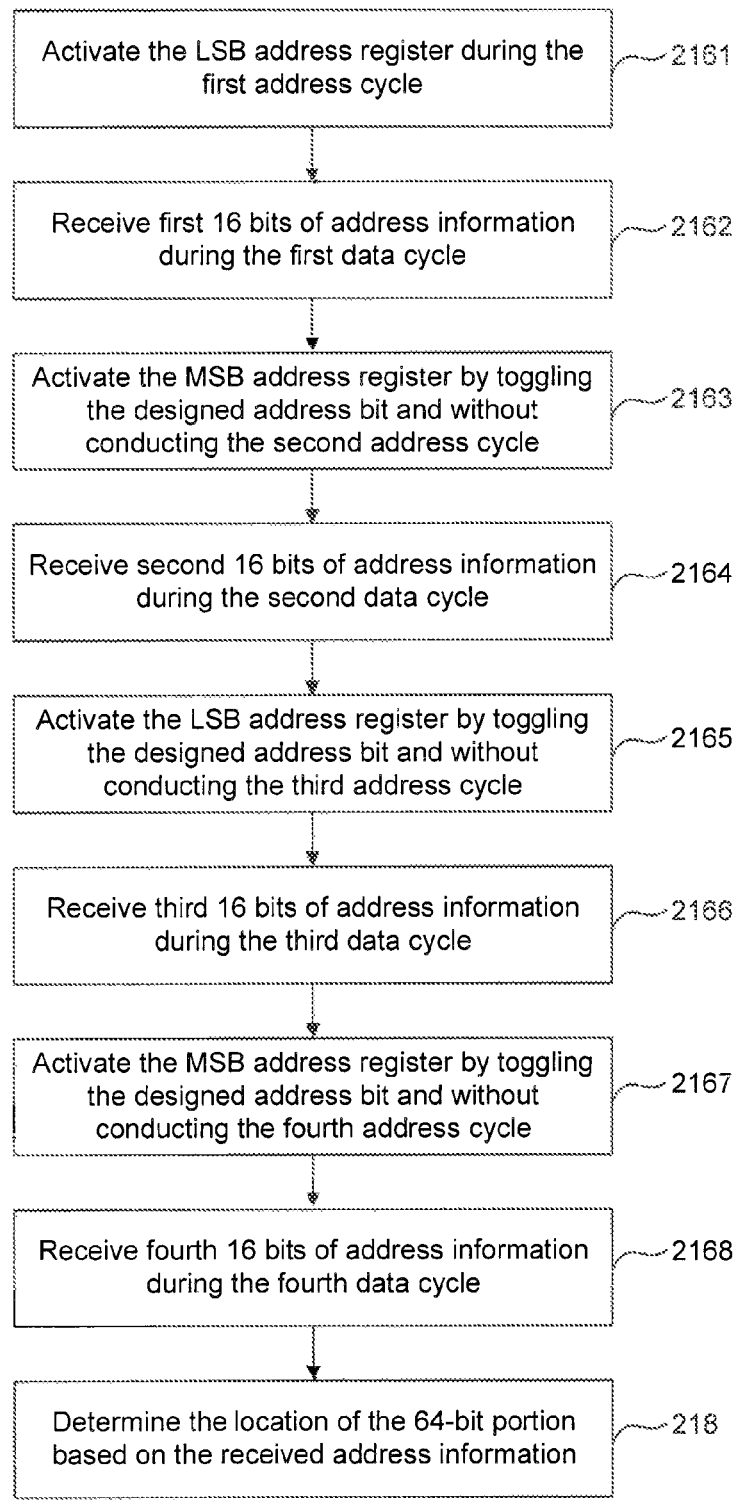
FIG. 2C illustrates the exemplary method performed in steps 216 and 218 according to an embodiment of the present disclosure.

For example, FIG. 2C illustrates the exemplary method performed in steps 216 and 218 according to an embodiment of the present disclosure. At step 2161, in the first address cycle, the processor 110 accesses and activates the LSB address register 139. Then at step 2162, during the first data cycle, the processor 110 writes the first 16 bits of address information corresponding to the 64-bit portion to the activated LSB address register 139. Now at step 2163, instead of conducting the second address cycle in which the processor 110 accesses and activates the MSB address register 138, the LMI block 120 automatically toggles the bit (the designed address bit) of the register address of the LSB address register 139 that is designed to be different from the corresponding bit of the register address of the MSB address register 138. This toggling enables the activation of the MSB address register 138 as the next address register to be accessed by the processor 110, as described in reference to FIG. 1B. Basically, the LMI block 120 avoids the need to conduct the second address cycle over the MDIO protocol through which the processor 110 accesses and activates the MSB address register 138. Then at step 2164, during the second data cycle, the processor 110 writes the second 16 bits of address information corresponding to the 64-bit portion to the activated MSB address register 139. At this point, the LMI block 120 may use the 16 bits of address information provided during the first data cycle together with the 16 bits of address information provided during the second data cycle to determine a first 32-bit portion (in which subsequently provided data is to be written) of the 64-bit portion of the memory space 142.

At step 2165, again, instead of conducting the third address cycle in which the processor 110 accesses and activates the LSB address register 139, the LMI block 120 automatically toggles the bit (the designed address bit) of the register address of the MSB address register 138 that is designed to be different from the corresponding bit of the register address of the LSB address register 139. This toggling enables the activation of the LSB address register 139 as the next address register to be accessed by the processor 110. Basically, the LMI block 120 avoids the need to conduct the third address cycle over the MDIO protocol through which the processor 110 accesses and activate the LSB address register 139. At step 2166, during the third data cycle, the processor 110 writes the third 16 bits of address information corresponding to the 64-bit portion to the now activated LSB address register 139. At step 2167, once again, instead of conducting the fourth address cycle in which the processor 110 accesses and activates the MSB address register 138, the LMI block 120 automatically toggles the designed address bit of the register address of the LSB address register 139 to activate the MSB address register 138. This toggling enables the activation of the MSB address register 138 as the next address register to be accessed by the processor 110. Basically, the LMI block 120 avoids the need to conduct the fourth address cycle over the MDIO protocol through which the processor 110 accesses and activate the MSB address register 138. During the fourth data cycle, the processor 110 writes the final 16 bits of address information corresponding to the 64-bit portion to the now activated MSB address register 138. At this point, again, the LMI block 120 uses the 16 bits of address information provided during the third data cycle together with the 16 bits of address information provided during the fourth data cycle to determine the second 32-bit portion (in which subsequently provided data is to be written) of the 64-bit portion of the memory space 142.

In this way, at step 218, the LMI block 120 determines the location of the 64-bit portion of the memory space 142.

At step 220, the LMI block 120 receives data information to be written (i.e., transacted) in accordance with the write command included in the command information without conducting all the MDIO protocol address cycles required conventionally. At step 222, the LMI block 120 writes the data information received at step 220 to the determined 64-bit portion 200 over the local network protocol.

Figure 2D:
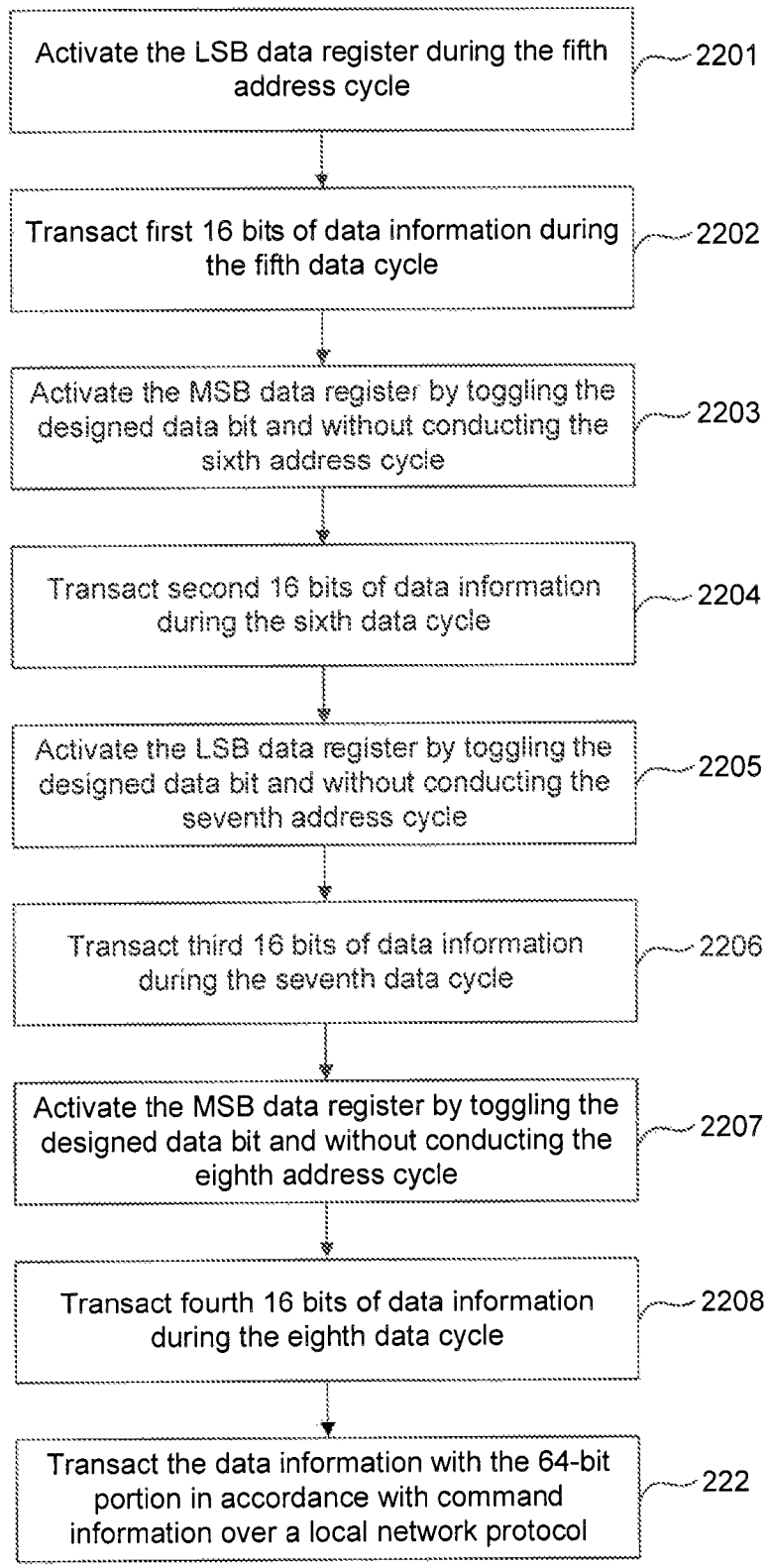
FIG. 2D illustrates the exemplary method performed in steps 220 and 222 according to an embodiment of the present disclosure.

For example, FIG. 2D illustrates the exemplary method performed in steps 220 and 222 according to an embodiment of the present disclosure. At step 2201, during the fifth address cycle, the processor 110 accesses and activates the LSB data register 137. Then, at step 2202, during the fifth data cycle, the processor 110 writes the first 16 bits of data (to be written to the memory space 142) to the activated LSB data register 137. Now, at step 2203, instead of conducting the sixth address cycle in which the processor 110 accesses and activates the MSB data register 136, the LMI block 120 automatically toggles the bit (the designed data bit) of the register address of the LSB data register 137 that is designed to be different from the corresponding bit of the register address of the MSB data register 136. This toggling enables the activation of the MSB data register 136 as the next address register to be accessed by the processor 110, as described above in reference to FIG. 1B. Basically, the LMI block 120 avoids the need to conduct the sixth address cycle over the MDIO protocol through which the processor 110 accesses and activate the MSB data register 136. At step 2204, during the sixth data cycle, the processor 110 writes the second 16 bits of data (to be written to the memory space 142) to the MSB data register 136. At this point, the LMI block 120 may write, over the local network protocol, the first 16 bits of data provided during the fifth data cycle together with the second 16 bits of data provided during the sixth data cycle to the first 32-bit portion of the 64-bit portion in the memory space 142.

At step 2205, again, instead of conducting the seventh address cycle in which the processor 110 accesses and activates the LSB data register 137, the LMI block 120 automatically toggles the designed data bit of the register address of the MSB data register 136. This toggling enables the activation of the LSB data register 137 as the next data register to be accessed by the processor 110. Basically, the LMI block 120 avoids the need to conduct the seventh address cycle over the MDIO protocol through which the processor 110 accesses and activate the LSB data register 137. At step 2206, during the seventh data cycle, the processor 110 writes the third 16 bits of data (to be written to the memory space 142) to the LSB data register 137. At step 2207, once again, instead of conducting the eighth address cycle in which the processor 110 accesses and activates the MSB data register 136, the LMI block 120 automatically toggles the designed data bit of the register address of the LSB data register 137. This toggling enables the activation of the MSB data register 136 as the next data register to be accessed by the processor 110. Basically, the LMI block 120 avoids the need to conduct the eighth address cycle over the MDIO protocol through which the processor 110 accesses and activates the MSB data register 136. At step 2208, during the eighth data cycle, the processor 110 writes the final 16 bits of data (to be written to the memory space 142) to the MSB data register 136. At this point, the LMI block 120 writes, over the local network protocol, the third 16 bits of data provided during the seventh data cycle together with the final 16 bits of data provided during the eighth data cycle to the second 32-bit portion of the 64-bit portion in the memory space 142. In this way, at step 222, the LMI block 120 transacts the data information with the 64-bit portion in accordance with the command information over the local network protocol.

At step 224, the LMI block 120 generates results information to be provided to the processor 110. In one embodiment, the results information may include confirmation information indicating whether the transacting of the data information in accordance with the command information was successful. The method stops at step 226.

Thus, in the address toggle mode, the LMI block 120 enables the processor 110 to write 64 bits of data to the memory space 142 in the MACsec function block 140 via only two address cycles and eight data cycles. In other words, in the address toggle mode, the processor 110 is not required to provide the address information that the processor 110 would conventionally have been required to provide during the second, the third, the fourth, the sixth, the seventh, and the eighth address cycles. Specifically, in this embodiment, the second, the third, the fourth, the sixth, the seventh, and the eighth address cycles are not conducted (but are referenced above for clarification and ease of understanding). In this way, communication via the MDIO protocol is made more efficient and the latency and throughput performance of the network is improved. It is also to be appreciated that when the processor 110 wishes to write to a large portion within the memory space 142, for example a 480-bit portion, the system 100 will significantly improve the latency in the throughput of the network by eliminating the excess MDIO cycles as discussed above.

Block Write Using Address Toggle Mode

As discussed above, under Clause 45 of the IEEE 802.3AE standard, the initialization and programming of the MACsec function block implemented in the PHY is very time-consuming because of the large capacity of the MACsec register and memory, the above-mentioned MDIO protocol address cycle requirement, and the ability to transact only 16 bits of data per cycle. In this case, the initialization and programming of the MACsec may undesirably last up to several seconds. To improve the timing associated with the initialization and programming of the MACsec, a block write mode is proposed.

Now, during initialization, the processor may be required to write large amounts of data to the register space 141 and/or the memory space 142 of the MACsec 140. For example, the processor 110 may have to write data to a table stored in the memory space 142, the table having 128 entries, for example. Each entry in the table may be capable of storing, for example, 32 bits of data. Conventionally, to write data to each of these 128 entries, the processor 110 requires four separate address cycles and four separate data cycles. In particular, during the first address cycle, the processor 110 accesses the LSB address register 139 to activate the LSB address register 139. Then, during the first data cycle, the processor 110 writes the first 16 bits of address information corresponding to the 32-bit entry to the activated LSB address register 139. During the second address cycle, the processor 110 then accesses and activates the MSB address register 139. Then, during the second data cycle, the processor 110 writes the second 16 bits of address information corresponding to the 32-bit entry to the activated MSB address register 139. At this point, the LMI block 120 uses the 16 bits of address information provided during the first data cycle together with the 16 bits of address information provided during the second data cycle to determine the location of the entry to which data is to be written.

Then, during the third address cycle, the processor 110 accesses the LSB data register 137 to activate the LSB data register 137. During the third data cycle, the processor 110 writes the first 16 bits of data (to be written to first 16 bits of the 32-bit entry) to the activated LSB data register 137. During the fourth address cycle, the processor 110 accesses and activates the MSB data register 136. During the fourth data cycle, the processor 110 writes the second 16 bits of data (to be written to the second 16 bits of the 32-entry) to the activated MSB data register 136. At this point, the LMI block 120 writes the first 16 bits of data provided during the third data cycle together with the second 16 bits of data provided during the fourth data cycle to the 32-bit entry of the table. Further, conventionally, the processor 110 would be required to repeat this process 127 additional times to complete the remaining 127 entries. As such, in the conventional network, the processor is required to use four address cycles and four data cycles to complete each entry. Therefore, to complete the 128 entries, the processor is required to use 512 address cycles and 512 data cycles. This makes the process of programming and initializing the MACsec very time-consuming and also burdensome for the network.

Conversely, in the block write mode, the LMI block 120 enables the elimination of a plurality of MDIO cycles to complete all 128 entries of the table. In particular, as discussed below, the LMI block 120 enables (i) the elimination of two (out of the conventionally required four) address cycles to complete the first entry, and (ii) the elimination of all four address cycles and two (out of the conventionally required four) data cycles for each of the remaining 127 entries.

Figure 3A:
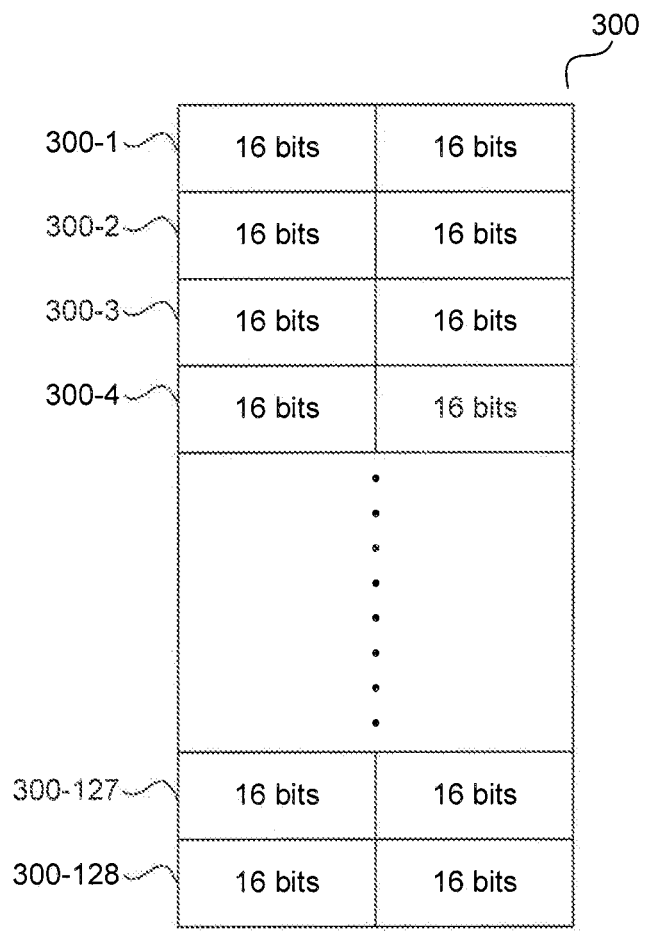
FIG. 3A illustrates an exemplary table 300 including the 128 entries 300-1 to 300-128, each entry being capable of storing 32 bits of data according to an embodiment of the present disclosure.
Figure 3B:
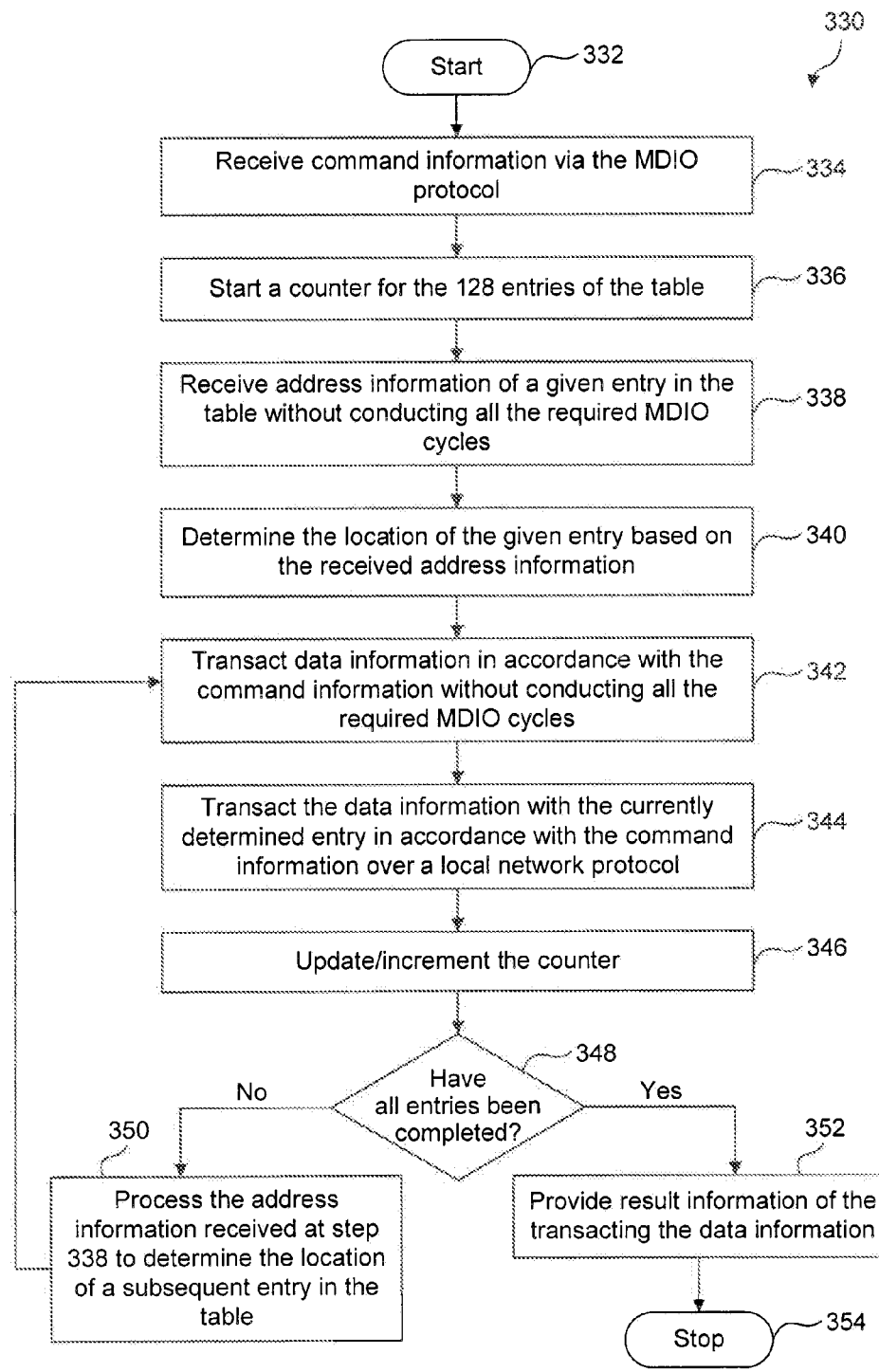
FIG. 3B illustrates an exemplary method 330 for writing data to the table 300 according to an embodiment of the present disclosure.

FIG. 3A illustrates an exemplary table 300 including the 128 entries 300-1 to 300-128, each entry being capable of storing 32 bits of data, for example, in two portions of 16 bits each. FIG. 3B illustrates an exemplary method 330 for writing data to the table 300 according to an embodiment of the present disclosure. The method starts at step 332. At step 334, the LMI block 120 receives command information related to the processor's wish to write data to the 128 entries in table 300. At step 336, the LMI block 120 starts a counter to count up to (or down from) 128, related to the 128 entries of table 300. An alternative number of table entries could be used other than 128, and the counter would count as necessary.

At step 338, once the counter has been started for the first entry, the LMI block 120 receives address information related to the first entry in the table 300 without conducting all the required MDIO protocol address cycles. Then, at step 340, the LMI block 120 determines the location of the first entry in the table 300 based on the address information received in step 338. For example, steps 338 and 340 include the following. In the first address cycle, the processor 110 accesses and activates the LSB address register 139. Then, during the first data cycle, the processor 110 writes the first 16 bits of address information corresponding to the first 32-bit entry to the activated LSB address register 139. Now, instead of conducting the second address cycle in which the processor 110 accesses and activates the MSB address register 138, the LMI block 120 automatically toggles the designed address bit of the register address of the LSB address register 139 that is designed to be different from the corresponding bit of the register address of the MSB address register 138. This toggling enables the activation of the MSB address register 138 as the next address register to be accessed by the processor 110. Basically, the LMI block 120 avoids the need to conduct the second address cycle over the MDIO protocol through which the processor 110 accesses and activates the MSB address register 138. Then, during the second data cycle, the processor 110 writes the second 16 bits of address information corresponding to the first 32-bit entry to the activated MSB address register 138. At this point, the LMI block 120 uses the 16 bits of address information provided during the first data cycle together with the 16 bits of address information provided during the second data cycle to determine the location of the first 32-bit entry in the table.

Then, at step 342, the LMI block 120 receives data information to be written (i.e., transacted) in accordance with the write command included in the command information, without conducting all the MDIO protocol address cycles required conventionally. At step 344, the LMI block 120 writes the data information received at step 342 to the determined location of the first entry 300-1 in the table 300. For example, steps 342 and 344 include the following. During the third address cycle, the processor 110 accesses the LSB data register 137 to activate the LSB data register 137. During the third data cycle, the processor 110 writes the first 16 bits of data (to be written to first 16 bits of the first 32-bit entry in the table) to the activated LSB data register 137. Now, instead of conducting the fourth address cycle in which the processor 110 accesses and activates the MSB data register 136, the LMI block 120 automatically toggles the designed data bit of the register address of the LSB data register 137 that is designed to be different from the corresponding bit of the register address of the MSB data register 136. This toggling enables the activation of the MSB data register 136 as the next address register to be accessed by the processor 110. Basically, the LMI block 120 avoids the need to conduct the fourth address cycle over the MDIO protocol through which the processor 110 accesses and activates the MSB data register 136. During the fourth data cycle, the processor 110 writes the second 16 bits of data (to be written to second 16 bits of the first 32-bit entry in the table) to the MSB data register 136. At this point, the LMI block 120 writes the first 16 bits of data provided during the third data cycle together with the second 16 bits of data provided during the fourth data cycle to the first 32-bit entry 300-1 in the table 300.

At the completion of the first entry, at step 346, the LMI block 120 increments the counter by one. At step 348, the LMI block 120 checks whether all entries have been completed by checking a present count of the counter verses the target count. When the count has not reached 128, the LMI block 120 determines that all entries have not been completed, and the process moves to step 350. At step 350, the LMI block 120 processes the address information of the previous (i.e., first) 32-bit entry received during the previous (i.e., first and second) data cycles to determine the location of the next (i.e., the second) 32-bit entry. In one embodiment, the LMI block 120 increments the address information of the previous 32-bit entry received during the previous data cycles to determine the location of the next 32-bit entry. Therefore, the processor 120 is not required to use any MDIO cycles (two address and two data) to provide address information of the next 32-bit entry in the table.

Then, the LMI block 120 repeats steps 342 to 350 to complete the remaining entries in the table 300. For example, the LMI block 120 automatically toggles the designed data bit of the register address of the currently active MSB data register 136 by recognizing that the MSB data register 136 was the last register accessed by the processor 110. This toggling enables the activation of the LSB data register 137 as the next data register to be accessed by the processor 110. Basically, the LMI block 120 avoids the need to conduct another address cycle over the MDIO protocol through which the processor 110 accesses and activates the LSB data register 137. In the next data cycle, the processor 110 writes the first 16 bits of data to be written to first 16 bits of the next (i.e., second) 32-bit entry in the table to the activated LSB data register 137. Now, instead of conducting the next address cycle in which the processor 110 accesses and activates the MSB data register 136, the LMI block 120 automatically toggles the designed data bit of the register address of the LSB data register 137 to enable the activation of the MSB data register 136 as the next address register to be accessed by the processor 110. During the next data cycle, the processor 110 writes the second 16 bits of data to be written to second 16 bits of the next (i.e., second) 32-bit entry in the table to the activated MSB data register 136. At this point, the LMI block 120 writes the first 16 bits of data together with the second 16 bits of data provided during the last two data cycles to the next (i.e., second) 32-bit entry in the table.

At the completion of the second entry, the LMI block 120 repeats steps 342 to 350 until all table entries have been completed. When the LMI block 120 determines that all 128 entries have been completed by checking the counter against the target number of table entries (e.g., 128), the process moves to step 352. At step 352, the LMI block 120 provides, to the processor, the results information of the transacting the data information transacted over the local network protocol in step 344. The method stops at step 354.

Therefore, by using the block write mode with the address toggle mode as discussed above, the LMI block 120 enables the processor 110 to write large amounts of data to the register space 141 and/or the memory space 142 in the MACsec function block 140, where the number of address and data cycles are reduced for the processor 110 when compared to that required by the conventional MDIO protocol. This assists in faster programming and initialization of the MACsec function block 140.

The above exemplary method 330 according to an embodiment of the disclosure assumes that the processor 110 wishes to write different 32-bit data to each of the 128 entries of the table 300. However, it is to be appreciated that the network may be made even more efficient when the processor 110 wishes to write the same 32-bit data to each of the 128 entries of the table. In this case, the LMI block 120 could enable (i) the elimination of two (out of the conventionally required four) address cycles to complete the first entry, and (ii) the elimination of all four address cycles and all four data cycles for each of the remaining 127 entries. For example, after completing one (e.g., the first) entry and then determining the location of the next (e.g., the second) entry as discussed above, the LMI block 120 would simply write the first 16 bits of data provided during the third data cycle together with the second 16 bits of data provided during the fourth data cycle to the next (e.g., the second) 32-bit entry in the table, and then repeats for all other entries in the table. The additional efficiency is achieved because the LMI block 120 completes all the rest of the 127 entries without conducting the respective multiple MDIO cycles. Finally, it is to be appreciated that the processor 110 may wish to write to or read from any subset of the 128 entries of the table 300.

Block Copy Using Address Toggle Mode

Sometimes, the processor may also be required to copy data written in one portion of the register space 141 and/or the memory space 142 to another portion within the register space 141 and/or the memory space 142. For example, the processor 110 may have to copy the data written in a table (source table) to another table (destination table). The processor 110 may provide command information to the LMI block 120 for this purpose. To write the data to the destination table, the processor 110 would have to read the data written in the 128 entries of the source table and then write the read data to the 128 entries in the destination table. Conventionally, to copy the data written in one entry of the source table to another one entry of the destination table, the processor 110 would have to employ eight separate address cycles and eight separate data cycles. Specifically, the processor 110 would have to employ four address cycles and four data cycles to read the data from each entry of the source table, and then employ another four address cycles and another four data cycles to write the data to the corresponding entry of the destination table.

In particular, during the first address cycle, the processor 110 accesses the LSB address register 139 to activate the LSB address register 139. Then, during the first data cycle, the processor 110 writes the first 16 bits of address information corresponding to the first 32-bit entry 400-1 of the source table 400 from which the data is to be read to the activated LSB address register 139. During the second address cycle, the processor 110 accesses and activates the MSB address register 138. Then, during the second data cycle, the processor 110 writes the second 16 bits of address information corresponding to the first 32-bit entry 400-1 of the source table 400 to the activated MSB address register 138. At this point, the LMI block 120 uses the 16 bits of address information provided during the first data cycle together with the 16 bits of address information provided during the second data cycle to determine the location of the entry from which data is to be read. Once the LMI block 120 has read the data from the first 32-bit entry 400-1 of the source table 400, during the third address cycle, the processor 110 accesses the LSB data register 137 to activate the LSB data register 137. During the third data cycle, the processor 110 receives the first 16 bits of data that is read from the first 32-bit entry 400-1 of the source table 400 via the activated LSB data register 137. During the fourth address cycle, the processor 110 accesses and activates the MSB data register 136. During the fourth data cycle, the processor 110 receives the second 16 bits of data that is read from the first 32-bit entry 400-1 of the source table 400 to the activated MSB data register 136.

Now, as previously discussed in the block write mode, the processor 110 uses the conventional four address cycles and four data cycles to write the read 32-bit data to the corresponding entry 401-1 of the destination table 401. Further, conventionally, the processor 110 would be required to repeat the above read and write processes another 127 times to complete the copying of the remaining 127 entries. As such, in the conventional network, the processor 110 is required to use eight address cycles and eight data cycles to complete the copying of each 32-bit entry. Therefore, to complete the 128 entries, the processor is required to use 1024 address cycles and 1024 data cycles. This makes the process of copying very time-consuming and also burdensome for the network.

Conversely, in the block copy mode, the LMI block 120 enables the elimination of a plurality of MDIO address cycles and MDIO data cycles to complete copying of all the 128 32-bit entries. In particular, as discussed below, the LMI block 120 enables (i) the elimination of seven (out of the required eight) address cycles and four (out of the required eight) data cycles to copy the first 32-bit entry, and (ii) the elimination of all eight address cycles and all eight data cycles for each of the remaining 127 entries.

Figure 4A:
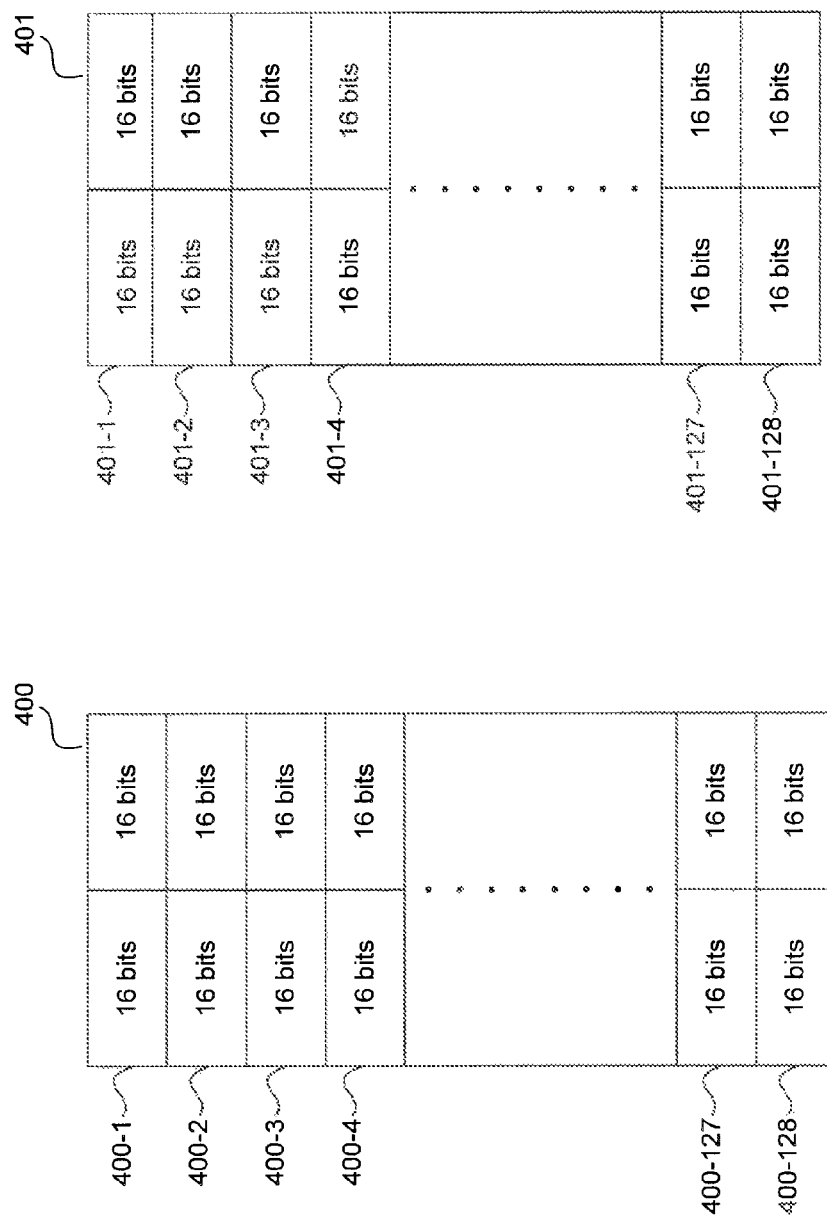
FIG. 4A illustrates exemplary source table 400 and exemplary destination table 401 according to an embodiment of the present disclosure.

FIG. 4A illustrates exemplary source table 400 and exemplary destination table 401 according to an embodiment of the present disclosure. The source table 400 includes 128 entries 400-1 to 400-128 and the destination table 401 includes 128 entries 401-1 to 401-128, each entry being capable of storing 32 bits of data.

Figure 4B:
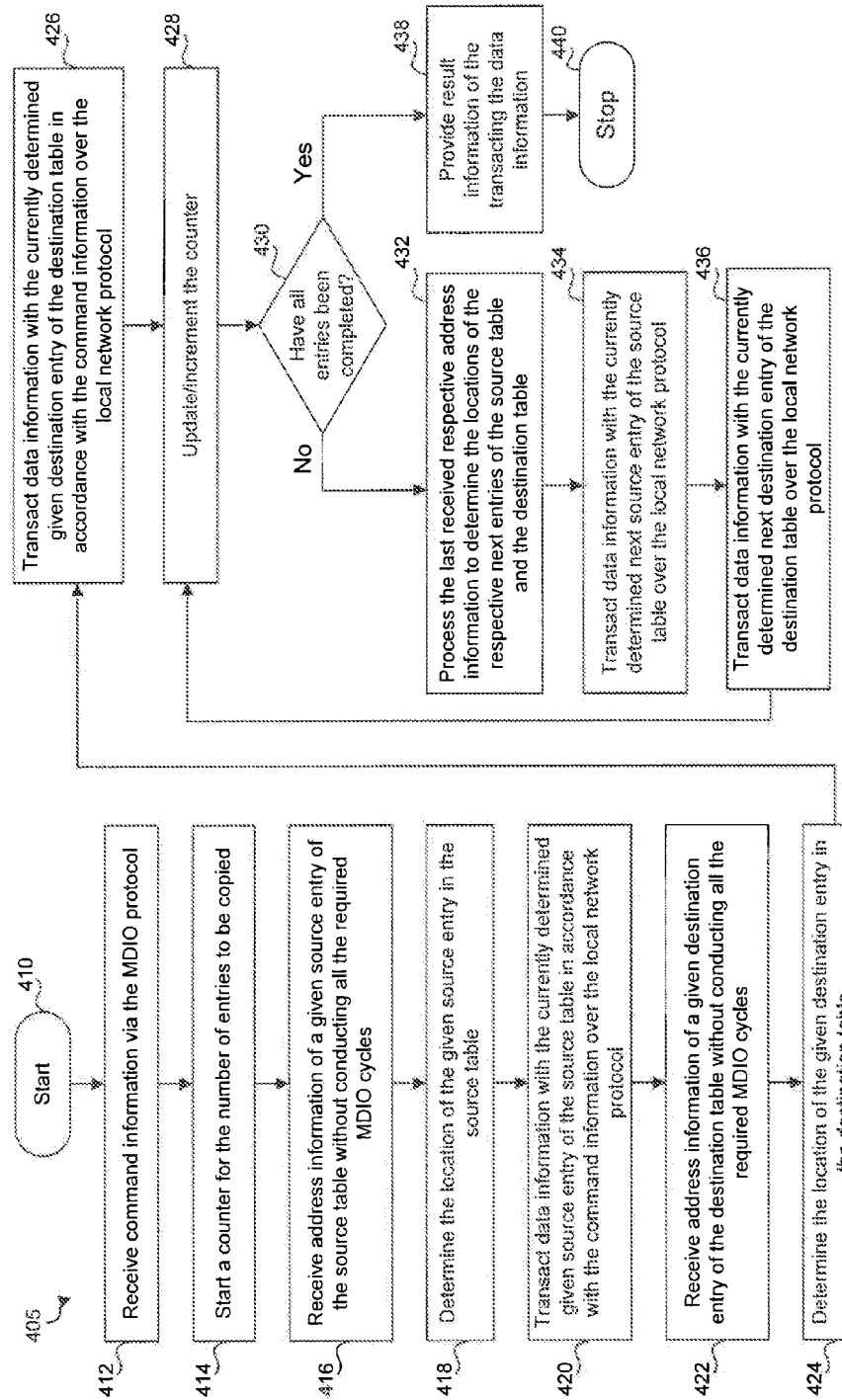
FIG. 4B illustrates an exemplary method 405 for copying data from the source table 400 to the destination table 401 according to an embodiment of the present disclosure.

FIG. 4B illustrates an exemplary method 405 for copying data from the source table 400 to the destination table 401 according to an embodiment of the present disclosure. The method starts at step 410. At step 412, the LMI block 120 receives command information related to the processor's wish to copy data from the source table 400 to the destination table 401. At step 414, the LMI block 120 starts a counter for the number of entries to be copied. For example, in this embodiment, the LMI block 120 starts a counter to count up to (or down from) 128 for the 128 entries of source table 400 that processor 110 wishes to copy. The 128 entries are provided for example purposes only, any number of entries could be copied according to the present disclosure.

At step 416, once the counter has been started for the first entry, the LMI block 120 receives address information related to the first entry 400-1 in the source table 400 without conducting all the required MDIO cycles. Then, at step 418, the LMI block 120 determines the location of the first entry 400-1 in the source table 400 based on the address information received in step 416. For example, steps 416 and 418 include the following. In the first address cycle, the processor 110 accesses and activates the LSB address register 139. Then, during the first data cycle, the processor 110 writes the first 16 bits of address information corresponding to the first 32-bit entry of the source table (from which data is to be read) to the activated LSB address register 139. Now, instead of conducting the second address cycle in which the processor 110 accesses and activates the MSB address register 138, the LMI block 120 automatically toggles the designed address bit of the register address of the LSB address register 139. This toggling enables the activation of the MSB address register 138 as the next address register to be accessed by the processor 110. Basically, the LMI block 120 avoids the need to conduct the second address cycle over the MDIO protocol through which the processor 110 accesses and activates the MSB address register 138. Then, during the second data cycle, the processor 110 writes the second 16 bits of address information corresponding to the first 32-bit entry of the source table (from which data is to be read) to the activated MSB address register 138. At this point, the LMI block 120 uses the 16 bits of address information provided during the first data cycle together with the 16 bits of address information provided during the second data cycle to determine the location of the first 32-bit entry 400-1 of the source table from which data is to be read.

At step 420, the LMI block 120 transacts (e.g., reads) data information with the currently determined (first) entry of the source table 400 over the local network protocol. For example, the LMI block 120 may read the data stored in the first 32-bit entry 400-1 of the source table 400 and store the same in memory 135.

At step 422, the LMI block 120 receives address information related to the first entry 401-1 in the destination table 401 without conducting all the required MDIO protocol address cycles. Then, at step 424, the LMI block 120 determines the location of the first entry 401-1 in the destination table 401 based on the address information received in step 422. For example, steps 422 and 424 include the following. For example, instead of conducting the third address cycle in which the processor 110 accesses and activates the LSB address register 139, the LMI block 120 automatically toggles the designed address bit of the register address of the MSB address register 138, since this was the last register accessed by the processor 110. This toggling enables the activation of the LSB address register 139 as the next address register to be accessed by the processor 110. Basically, the LMI block 120 avoids the need to conduct the third address cycle through which the processor 110 accesses and activates the LSB address register 139. During the third data cycle, the processor 110 writes the first 16 bits of address information corresponding to the first 32-bit entry of the destination table (to which data is to be written) to the activated LSB address register 139. Now, instead of conducting the fourth address cycle in which the processor 110 accesses and activates the MSB address register 138, the LMI block 120 automatically toggles the designed address bit of the register address of the LSB address register 139. This toggling enables the activation of the MSB address register 138 as the next address register to be accessed by the processor 110. Basically, the LMI block 120 avoids the need to conduct the fourth address cycle over the MDIO protocol through which the processor 110 accesses and activates the MSB address register 138. Then, during the fourth data cycle, the processor 110 writes the second 16 bits of address information corresponding to the first 32-bit entry of the destination table (to which data is to be written) to the activated MSB address register 139. At this point, the LMI block 120 uses the 16 bits of address information provided during the third data cycle together with the 16 bits of address information provided during the fourth data cycle to determine the location of the first 32-bit entry of the destination table to which data is to be written.

At step 426, the LMI block 120 transacts data information with the currently determined entry of the destination table 401 in accordance with the command information over the local network protocol. For example, the LMI block 120 may write the read data stored in the memory 135 to the first 32-bit entry 401-1 of the destination table 401. In this way, the copying of the first 32-bit entry from the source table to the destination table is completed.

At step 428, the LMI block 120 increments the counter by one. At step 430, the LMI block 120 checks whether all entries have been completed. When the LMI block 120 determines that all entries have been completed, the process moves to step 438. At step 438, the LMI block 120 generates results information based on the transacting of the data information. In one embodiment, the results information may include confirmation information indicating the completion of the copying of all 128 entries (400-1 to 400-128) of the source table 400 to all 128 entries (401-1 to 401-128) of the destination table 401. The process ends at step 440.

Alternatively, when the LMI block 120 determines that all entries have not been completed, the process moves to step 432. At step 432, the LMI block 120 processes the address information received in step 416 to determine the address information of a subsequent entry of the source table 400 and processes the address information received in step 422 to determine the address information of a subsequent entry of the destination table 401. In one embodiment, the processing at step 432 includes incrementing the address information of the first 32-bit entry 400-1 of the source table 400 to determine the address information of the second 32-bit entry 400-2 of the source table 400, and includes incrementing the address information of the first 32-bit entry 401-1 of the destination table 401 to determine the address information of the second 32-bit entry 401-2 of the destination table 401.

At step 434, the LMI block 120 transacts data information with the currently determined subsequent entry of the source table 400. In one embodiment, the LMI block 120 reads data information from the second entry 400-2 of the source table 400 over the local network protocol, and stores the same in memory 135.

At step 436, the LMI block 120 transacts data information with the currently determined subsequent entry of the destination table 401 in accordance with the command information over the local network protocol. For example, the LMI block 120 writes the read data stored in the memory 135 (in step 434) to the second 32-bit entry 401-1 of the destination table 401. In this way, the copying of the second 32-bit entry 400-2 from the source table 400 to the second 32-bit entry 401-2 of the destination table 401 is completed. The process then moves to step 428. Again, if the LMI block 120 determines that all entries have not been completed (step 430), then the process moves to step 432, and the LMI block 120 repeats steps 432 to 436 until all 128 entries are completed.

Therefore, by using the block copy mode with the address toggle mode as discussed above, the LMI block 120 enables the processor 110 to copy large amounts of data from one location in the register space 141 and/or the memory space 142 to another location in the register space 141 and/or the memory space 142. Further, the LMI block 120 enables the same while reducing the address cycles and data cycles needed by the processor 110, when compared with that required by the conventional MDIO protocol. Also, by having all the copied data transacted (read and written) over the local protocol between the LMI block 120 and the MACsec function block 140, as opposed to over the MDIO protocol between the LMI block 120 and the processor 110, the latency and throughput over the network are improved.

Memory Byte Write Using Address Toggle Mode

Sometimes, the processor 110 may wish to modify data written in an entry of a table in the MACsec function block 140. Further, the processor 110 may wish to only partially modify the entry of the table by modifying one byte of data within the entry. For example, the table may contain 128 entries, each entry being eight (8) bytes (i.e., 64 bits) long, and the processor 110 may wish to modify at least one of the eight bytes within a given entry of the table. In such a situation, to enhance efficiency of the network, a memory byte write mode is provided. In the memory byte write mode, the LMI block 120 enables the processor 110 to provide, over the MDIO protocol, the address information of the given entry storing the bytes that are to be modified, specify the byte/bytes which is/are to be modified, and provide the write data that is to be used to modify the specified byte/bytes. In one embodiment, as discussed below, the processor 110 specifies the byte/bytes to be modified by providing respective offset/offsets related to the respective byte/bytes that is/are to be modified. The LMI block 120 then reads the data currently written in the given entry and modifies, over the local protocol, the specified bytes with the write data, and thereby minimizing communication over the MDIO protocol and enhancing efficiency of the network.

Figure 5A:
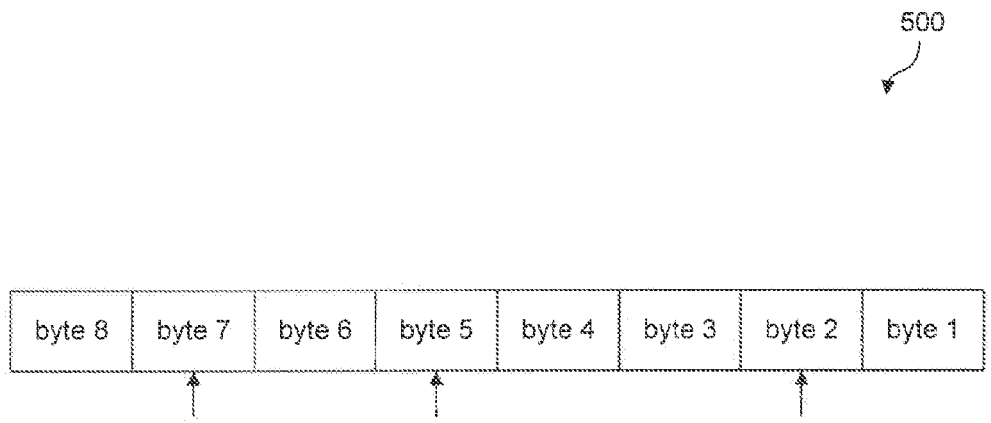
FIG. 5A illustrates an exemplary 64-bit entry 500 according to an embodiment of the present disclosure.

FIG. 5A illustrates an exemplary 64-bit entry 500 that the processor 110 wishes to modify. The 64-bit entry 500 contains eight bytes—byte1 having bits 0-7, byte2 having bits 8-15, byte3 having bits 16-23, byte4 having bits 24-31, byte5 having bits 32-39, byte6 having bits 40-47, byte7 having bits 48-55, and byte8 having bits 56-63.

Figure 5B:
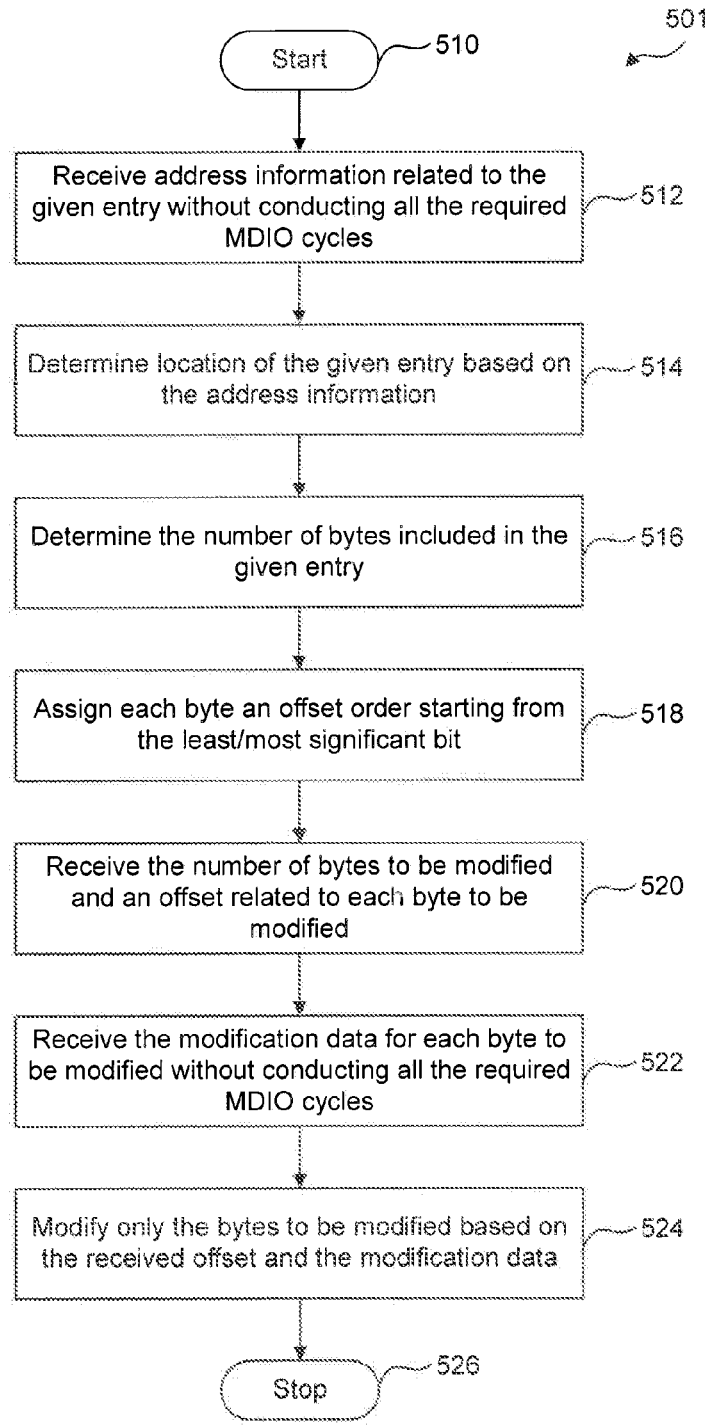
FIG. 5B illustrates an exemplary method 501 according to an embodiment of the present disclosure.

FIG. 5B illustrates an exemplary method 501 according to an embodiment of the present disclosure performed in the network in which the processor 110 wishes to modify byte2, byte5, and byte7. The method starts at step 510.

At step 512, the LMI block 120 receives address information related to the given (e.g., the above 64-bit) entry that the processor 110 wishes to modify. In particular, during the first address cycle, the processor 110 accesses and activates the LSB address register 139. Then, during the first data cycle, the processor 110 writes the first 16 bits of address information corresponding to the 64-bit entry of the table to the activated LSB address register 139. Now, instead of conducting the second address cycle in which the processor 110 accesses and activates the MSB address register 138, the LMI block 120 automatically toggles the designed address bit of the register address of the LSB address register 139. This toggling enables the activation of the MSB address register 138 as the next address register to be accessed by the processor 110. Basically, the LMI block 120 avoids the need to conduct the second address cycle over the MDIO protocol through which the processor 110 accesses and activates the MSB address register 138. Then, during the second data cycle, the processor 110 writes the second 16 bits of address information corresponding to the 64-bit entry of the table to the activated MSB address register 138. Again, instead of conducting the third address cycle in which the processor 110 accesses and activates the LSB address register 139, the LMI block 120 automatically toggles the designed address bit of the register address of the MSB address register 138 which was last accessed by the processor 110. This toggling enables the activation of the LSB address register 139 as the next address register to be accessed by the processor 110. Basically, the LMI block 120 avoids the need to conduct the third address cycle over the MDIO protocol through which the processor 110 accesses and activates the LSB address register 139. Then, during the third data cycle, the processor 110 writes the third 16 bits of address information corresponding to the 64-bit entry of the table to the activated LSB address register 139. Now, instead of conducting the fourth address cycle in which the processor 110 accesses and activates the MSB address register 138, the LMI block 120 automatically toggles the designed address bit of the register address of the LSB address register 139 to activate the MSB address register 138, as previously discussed. Then, during the fourth data cycle, the processor 110 writes the fourth 16 bits of address information corresponding to the 64-bit entry of the table to the activated MSB address register 138.

At step 514, the LMI block 120 determines the location of the 64-bit entry in the table based on the above address information received during step 512.

At step 516, the LMI block 120 determines the number of bytes included in the 64-bit entry. For example, in the present embodiment, the LMI block 120 determines that the 64-bit entry includes eight bytes.

At step 518, the LMI block 120 assigns each byte included in the determined number of bytes an offset number starting from the least significant bit (or, for example, the most significant bit) of the 64-bit entry. For example, starting from the least significant bit, the LMI block 120 assigns byte1 an offset number of 0, byte2 an offset number of 1, byte3 an offset number of 2, byte4 an offset number of 3, byte5 an offset number of 4, byte6 an offset number of 5, byte7 an offset number of 6, and byte8 an offset number of 7. As discussed below, the above offset numbers assist the LMI block 120 in determining which byte is to be processed (for example, modified).

At step 520, the LMI block 120 receives from the processor 110 the total number of bytes that are to be modified and an offset number related to each byte that is to be modified. For example, when the processor 110 wishes to modify bytes byte2, byte5, and byte7 (indicated by arrows in FIG. 5A), the LMI block 120 may receive command information from the processor 110 that a total number of three bytes are to be modified, and may receive offset numbers 1, 4, and 6 which respectively indicate that byte2, byte5, and byte7 are to be modified.

At step 522, the LMI block 120 receives the modification data for each byte that is to be modified. For example, in the present embodiment, the LMI block 120 receives three bytes of modification data from the processor 110 to modify byte2, byte5, and byte7, respectively. In one embodiment, the modification data is provided in an order corresponding to the order in which the offset numbers are provided. For example, during the fifth address cycle, the processor 110 accesses the LSB data register 137 to activate the LSB data register 137. During the fifth data cycle, the processor 110 writes 16 bits (i.e., 2 bytes) of modification data to the activated LSB data register 137. The 16 bits of modification data are used to modify byte2 and byte5. For example, the lower eight bits of modification data are used to modify byte2 and the higher eight bits are used to modify byte5. Now, instead of conducting the sixth address cycle in which the processor 110 accesses and activates the MSB data register 136, the LMI block 120 automatically toggles the designed data bit of the register address of the LSB data register 137 to activate the MSB data register 136, as previously discussed. During the sixth data cycle, the processor 110 writes another 16 bits of modification data to the activated MSB data register 136. In this example, the lower eight bits are used to modify byte7 and the higher eight bits may be null (or any other information) data, which indicates to the LMI block 120 that this null data is not to be used in the modification process.

At step 524, the LMI block 120 accesses the 64-bit entry in the table. The LMI block 120 also starts a counter equal to the total number of bytes that are to be modified. Then, based on the order of the received offset numbers and the modification data received in step 522, the LMI block 120 determines that byte2 is to be modified using the lower eight bits of modification data received during the fifth data cycle in step 522. Now, over the local network protocol, LMI block 120 reads the current data written in byte2, replaces or modifies the current data with the lower eight bits modification data received during the fifth data cycle, and writes or stores the modified byte2 within the 64-bit entry. Once the modification of the first byte (byte2) is completed, the LMI block 120 updates the counter and determines whether each of the total number of bytes to be modified has been modified. If the LMI block 120 determines that all the required bytes have not been modified, then the LMI block 120 moves on to the next offset number in the order of the provided offset numbers. Accordingly, the LMI block 120 determines that byte5 is to be modified using the higher eight bits of modification data received during the fifth data cycle in step 522. Again, over the local network protocol, LMI block 120 reads the current data written in byte5, replaces or modifies the current data with the higher eight bits modification data received during the fifth data cycle, and writes or stores the modified byte5 within the 64-bit entry. Once again, if the LMI block determines that all the required bytes have not been modified, then the LMI block 120 moves on to the next offset number in the order of the provided offset numbers. The LMI block 120 determines that byte7 is to be modified using the lower eight bits of modification data received during the sixth data cycle in step 522. Over the local network protocol, LMI block 120 reads the current data written in byte7, replaces or modifies the current data with the lower eight bits modification data received during the sixth data cycle, and writes or stores the modified byte7 within the 64-bit entry. At this point, based on the counter, the LMI block 120 determines that all the required bytes have been modified. In one embodiment, the LMI block 120 may determine that all the required bytes have been modified based on the counter and/or the null data included in the higher eight bits of modification data received during the sixth data cycle in step 522. The process ends at step 526.

In the above example, it is disclosed that the processor 110 wishes to modify discrete bytes byte2, byte5, and byte7. However, it is to be appreciated that the system 100 may further improve the efficiency in the network when the processor 110 wishes to modify contiguous bytes such as, for example, byte2 and byte3. In this case, the processor 110 may need to specify only one offset associated with the first byte that is to be modified. Therefore, when the processor 110 wishes to modify any number of contiguous bytes, the LMI block 120 receives, at step 520, the number of bytes to be modified and an offset related to only the first byte (of the contiguous bytes) that is to be modified. Then, as discussed above, at step 522, the LMI block 120 receives the modification data for byte2 and byte3 without conducting all the required MDIO cycles. Finally, as discussed above, at step 524, the LMI block 120 modifies byte 2 and byte 3. The efficiency of the network is improved by eliminating the need for the LMI block 120 to receive the offsets related to each of the bytes to be modified over separate MDIO cycles.

Furthermore, in order to improve the efficiency of the network, the LMI block 120 may modify contiguous bytes even when the processor 110 wishes to modify discrete bytes. For example, when the processor 110 wishes to modify discrete bytes byte2 and byte4, the LMI block 120 may receive, at step 520, information that two bytes (byte2, byte4) are to be modified and an offset related to only byte2. The LMI block 120 thereby eliminates the need to receive an offset related to byte4 over a separate MDIO cycle. Then, as discussed above, at step 522, the LMI block 120 receives the modification data for byte2 and byte4 without conducting all the required MDIO cycles. Finally, as discussed above, at step 524, the LMI block 120 reads contiguous bytes—byte2, byte3, and byte4—and modifies byte 2 and byte 4 based on the information received at step 520.

The MACsec function block 140 may provide resources to implement MACsec functionality on the network such as data confidentiality, data integrity, data origin authentication, and/or other security related function. The MACsec 140 may include storage space in the form of register space 141 and/or memory space 142. For example, the MACsec 140 may require access to registers and/or memory having data width (s) not limited to 16 bits. By implementing the MACsec 140 within the PHY 150, the standard MDIO protocol used to provide communication between the higher layer device (e.g., processor 110) and the OSI model device 160 may remain unchanged, thereby overcoming the above limitations of the MDIO protocol without replacing the existing hardware of the network.

The register space 141 and the memory space 142 may be used to store data, and provide the LMI block 120 with storage space beyond what has been allotted via the interface registers 130. The register space 141 may include a smaller storage space that is more quickly accessible than the memory space 142. The register space 141 may be used to store data that is to be stored in the memory space 142, data that is to be operated on and then placed back in memory space 142, and/or data that is repeatedly accessed. For example, in performing a data read command on the MACsec 140, the data that was read from the memory space 142 may be stored in the register space 141 until it is provided to the LMI block 120. Alternatively, for example, during the performance of a data write command, the data to be written to the memory space 142 may be stored in the register space 141 until it may be written to the memory space 142.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure or the claims. Further, the scope of the invention is defined only in accordance with the following claims and their equivalents.

The forgoing Detailed Description of the exemplary embodiments has revealed the general nature of the present disclosure so that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

It will be apparent to those skilled in the relevant art(s) that various changes in form and detail can be made therein without departing from the spirit and scope of the present disclo-

What is claimed is:

1. A system, comprising:
a media access control security (MACsec) functional block configured to communicate over a local network protocol;
a processor configured to communicate over management data input/output (MDIO) protocol; and
a layer management interface (LMI) configured to communicate with the processor over the MDIO protocol and to communicate with the MACsec over the local network protocol, wherein the LMI is further configured to
receive, from the processor, command information for transacting data information with a destination portion within the MACsec;
receive, from the processor, address information associated with the destination portion without conducting all the MDIO cycles required by the MDIO protocol to receive the address information;
determine a location of the destination portion within the MACsec based on the received address information;
transact, with the processor, the data information without conducting all MDIO cycles required by the MDIO protocol to transact the data information; and
transact the data information with the determined destination portion in accordance with the command information over the local network protocol.

2. The system of claim 1, wherein transacting the data information with the determined destination portion includes reading data from or writing data to the determined destination portion.

3. The system of claim 1, wherein the LMI is further configured to provide, to the processor, results information related to the transacting the data information with the determined destination portion.

4. The system of claim 1, wherein the LMI comprises an address register, and wherein the LMI is configured to toggle a designated bit included in a register address of the address register to receive consecutive portions of the address information.

5. The system of claim 4, wherein the LMI is configured to toggle the designated bit included in the register address of the address register based on a recognition that the address register was the last register accessed by the processor.

6. The system of claim 1, wherein the LMI comprises a data register, and wherein the LMI is configured to toggle a designated bit included in a register address of the data register to receive consecutive portions of the data information.

7. The system of claim 6, wherein the LMI is configured to toggle the designated bit included in the register address of the data register based on a recognition that the data register was the last register accessed by the processor.

8. A layer management interface (LMI) configured to communicate with a processor over management data input/output (MDIO) protocol, and to communicate with a media access control security (MACsec) functional block over a local network protocol, the LMI comprising:
a command register configured to receive, from the processor, command information for transacting data information with a destination portion within the MACsec;
an address register configured to receive, from the processor, address information associated with the destination portion without conducting all the MDIO cycles required by the MDIO protocol to receive the address information, the LMI being configured to determine a location of the destination portion based on the received address information; and
a data register configured to transact, with the processor, the data information without conducting all MDIO cycles required by the MDIO protocol to transact the data information, and to transact the data information with the determined destination portion in accordance with the command information over the local network protocol.

9. The LMI of claim 8, wherein the data register is further configured to read data from or write data to the determined destination portion to transact the data information with the determined destination portion.

10. The LMI of claim 8, being configured to provide, to the processor, results information related to the transaction of the data information with the determined destination portion.

11. The LMI of claim 8, wherein the address register comprises:
a first address register having a first register address with a first designated bit; and
a second address register having a second register address with a second designated bit that is designed to have a different logic value compared to the first designated bit;
wherein the LMI is configured to activate the second address register by toggling the first designated bit of the first register address.

12. The LMI of claim 11, wherein the LMI is configured to toggle the first designated bit based on a recognition that the first address register was the last register accessed by the processor and that the second register is the next register to be accessed by the processor.

13. The LMI of claim 8, wherein the data register comprises:
a first data register having a first register address with a first designated bit;
a second data register having a second register address with a second designated bit that is designed to have a different logic value compared to the first designated bit;
wherein the LMI is configured to activate the second data register by toggling the first designated bit of the first register address.

14. The LMI of claim 13, wherein the LMI is configured to toggle the first designated bit based on a recognition that the first data register was the last register accessed by the processor and that the second data register is the next register to be accessed by the processor.

15. A method performed in a layer management interface (LMI), the method comprising:
communicating with a media access control security (MACsec) functional block over a local network protocol;
communicating with a processor over management data input/output (MDIO) protocol;
receiving, from the processor, command information for transacting data information with a destination portion within the MACsec;
receiving, from the processor, address information associated with the destination portion including skipping at least one MDIO cycle required by the MDIO protocol to receive the address information;
determining, in the LMI, a location of the destination portion within the MACsec based on the received address information;

transacting, with the processor, the data information including skipping at least one MDIO cycle required by the MDIO protocol to transact the data information; and transacting, with the determined destination portion, the data information in accordance with the command information over the local network protocol.

16. The method of claim 15, further comprising:

providing, to the processor, results information related to the transacting the data information with the determined destination portion.

17. The method of claim 15, wherein receiving the address information includes toggling a designated bit included in a register address of the address register to receive consecutive portions of the address information.

18. The method of claim 17, wherein the toggling the designated address bit includes toggling the designed bit based on a recognition that the address register was the last register accessed by the processor.

19. The method of claim 15, wherein the receiving the data information includes toggling a designated bit included in a register address of a data register to receive consecutive portions of the data information.

20. The method of claim 19, wherein the toggling the designed bit includes toggling the designed bit based on a recognition that the data register was the last register accessed by the processor.

* * * * *

UNITED STATES PATENT AND TRADEMARK OFFICE
CERTIFICATE OF CORRECTION

PATENT NO. : 8,635,392 B1  
APPLICATION NO. : 13/651107  
DATED : January 21, 2014  
INVENTOR(S) : David Wei Wang Page 1 of 1

It is certified that error appears in the above-identified patent and that said Letters Patent is hereby corrected as shown below:

In the Claims

Column 23, Line 10, Claim 1, please replace "over management" with --over a management--.

Column 23, Line 16, Claim 1, please replace "to" with --to;--.

Column 23, Line 22, Claim 1, please replace "all the MDIO" with --all MDIO--.

Column 23, Line 67, Claim 5, please replace "all the MDIO" with --all MDIO--.

Column 25, Line 16, Claim 18, please replace "designated address bit includes toggling the designed bit" with --designated bit includes toggling the designated bit--.

Column 25, Lines 19-20, Claim 19, please replace "wherein receiving the data information includes" with --further comprising: receiving the data information including--.

Column 25, Line 24, Claim 20, please replace "designed bit includes toggling the designed" with --designated bit includes toggling the designated--.

Signed and Sealed this  
Twenty-seventh Day of May, 2014

Michelle K. Lee  
*Deputy Director of the United States Patent and Trademark Office*